(12) United States Patent  (10) Patent No.: US 8,924,504 B2
Yang et al.  (45) Date of Patent: Dec. 30, 2014

(54) COPROCESSING MODULE FOR PROCESSING ETHERNET DATA AND METHOD FOR USE THEREWITH

(75) Inventors: Xinhui (Philip) Yang, North York (CA); Lewis Leung, Markham (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1309 days.

(21) Appl. No.: 12/642,500

(22) Filed: Dec. 18, 2009

(65) Prior Publication Data

US 2011/0099244 A1   Apr. 28, 2011

Related U.S. Application Data

(60) Provisional application No. 61/254,108, filed on Oct. 22, 2009.

(51) Int. Cl.
  *G06F 15/16*   (2006.01)
  *H04L 29/06*   (2006.01)

(52) U.S. Cl.
  CPC ..................................... *H04L 67/40* (2013.01)
  USPC ....................................................... 709/217

(58) Field of Classification Search
  USPC ....................................................... 709/217
  See application file for complete search history.

(56) References Cited

U.S. PATENT DOCUMENTS

| | | | | |
|---|---|---|---|---|
| 7,284,070 | B2 * | 10/2007 | Boucher et al. | 709/250 |
| 8,131,904 | B2 * | 3/2012 | Utz et al. | 710/301 |
| 2005/0278460 | A1 * | 12/2005 | Shin et al. | 710/1 |
| 2006/0075119 | A1 * | 4/2006 | Hussain et al. | 709/227 |
| 2007/0220495 | A1 * | 9/2007 | Chen et al. | 717/130 |
| 2010/0023626 | A1 * | 1/2010 | Hussain et al. | 709/227 |

* cited by examiner

*Primary Examiner* — Arvin Eskandarnia
*Assistant Examiner* — Natisha Cox
(74) *Attorney, Agent, or Firm* — Garlick & Markison; Bruce E. Stuckman

(57) ABSTRACT

A co-processing module communicates with at least one remote device via an Ethernet communication link. The co-processing module includes a first processor that executes an application of the host device via a first operating system, the application including socket system calls. A second processor executes a second operating system to execute a transport control protocol/Internet protocol stack, an Ethernet driver, and an Ethernet media access control layer, to bidirectionally communicate first data via the Ethernet communication link and further to bidirectionally communicate the first data with the first processor. The first processor bidirectionally communicates the first data with the application via the socket system calls.

15 Claims, 5 Drawing Sheets

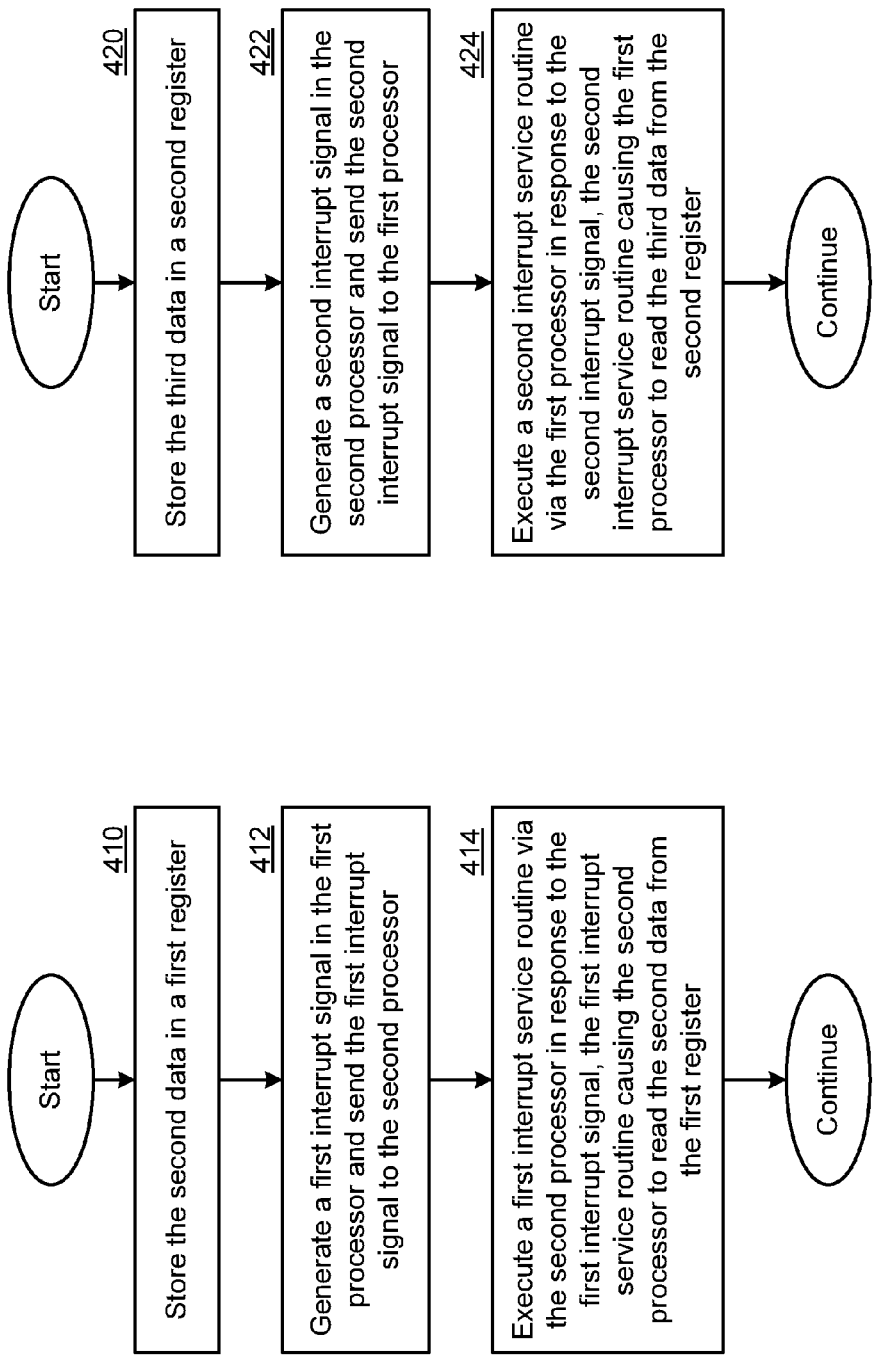

US 8,924,504 B2

COPROCESSING MODULE FOR PROCESSING ETHERNET DATA AND METHOD FOR USE THEREWITH

CROSS REFERENCE TO RELATED PATENTS

The present application claims priority under 35 U.S.C. §119(e) from the provisional U.S. patent application Ser. No. 61/254,108 filed on Oct. 22, 2009, entitled, "COPROCESSING MODULE FOR PROCESSING ETHERNET DATA AND METHOD FOR USE THEREWITH" the contents of which are incorporated herein by reference thereto.

TECHNICAL FIELD OF THE INVENTION

The present invention relates to processing systems that communicate via an Ethernet link.

DESCRIPTION OF RELATED ART

Ethernet describes a family of communication protocols that have been standardized in IEE 802.3. A popular version of Ethernet is 10Base-T that allows communications of up to 10 Mb/sec. Further versions including 100 Mb/sec, and gigabit Ethernet are also available. These protocols are packet/frame-based and are implemented via a media access control (MAC) layer format. Devices communicate with one another by sending packets that identify their intended destination by a 48-bit MAC address of the destination device.

The Ethernet family of protocols has become a popular choice for wired communication networks, large and small. The high data rates supported by Ethernet networks allow the communication of many types of data including real-time audio and video programming. With these high data rates, come increased computational requirements to handle the large amount of data carried by these communication paths.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 7 presents a flowchart representation of a method in accordance with an embodiment of the present invention.

FIG. 8 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
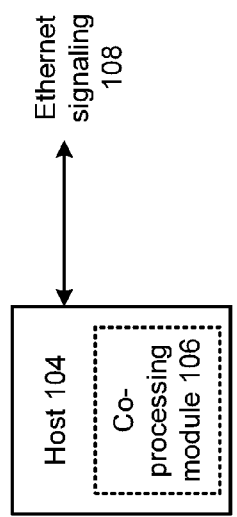
FIG. 1 presents a block diagram representation of a co-processing module 106 and host module 104 in accordance with an embodiment of the present invention.

FIG. 1 presents a block diagram representation of a co-processing module 106 and host module 104 in accordance with an embodiment of the present invention. In particular, a co-processing module operates in conjunction with host 104 to facilitate bi-direction communication execute with at least one remote device via Ethernet signaling 108 and further executes one or more host applications that utilize or otherwise operate in conjunction with such an Ethernet interface. The Ethernet signaling 108 can include a digital video stream, a digital audio stream, a digital multimedia signal, a communication signal or other real-time or non-real-time data signal that traverses a LAN, WLAN, Internet gateway, or other network or network device or other device that utilizes an Ethernet protocol.

In a particular embodiment, host 104 executes an application pertaining to the encoding, decoding, transcoding and/or display of video signals and Ethernet signaling 108 is exchanged with or used in conjunction with one or more sources such as a broadcast cable system, a broadcast satellite system, internet protocol (IP) TV system, the Internet, a digital video disc player, a digital video recorder, or other video source. In an embodiment of the present invention, the video signals can include digital broadcast video signals, such as a high definition television signal, enhanced high definition television signal or other broadcast video signal that has been transmitted over a wireless medium, either directly or through one or more satellites or other relay stations or through a cable network, optical network or other transmission network. In addition, the video signals can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Co-processing module includes a plurality of processors. One or more processors run the host applications, while one or more other processers are used to offload the Ethernet processing. In this fashion, the host applications can be executed more efficiently and command more dedicated processing power. Further details regarding co-processing module 106 and host module 104, including several optional features and implementations, are presented in conjunction with the figures that follow.

Figure 2:
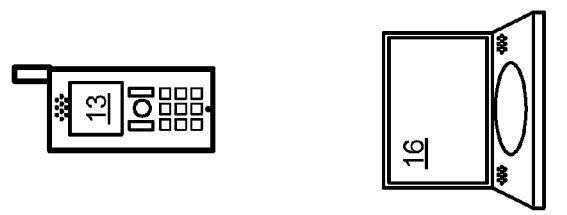
FIG. 2 presents a pictorial representation of example host devices 11-16 in accordance with an embodiment of the present invention.
Figure 2:
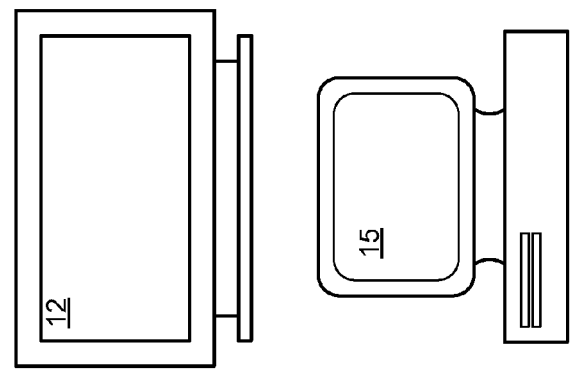
Figure 2:
Figure 2:
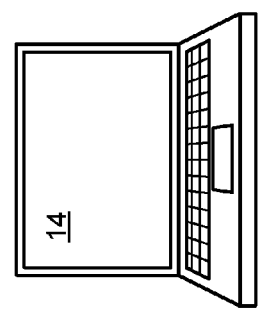

FIG. 2 presents a pictorial representation of example host devices 11-16 in accordance with an embodiment of the present invention. In particular, examples of host device 104 include digital video recorder/set top box 11, television or monitor 12, wireless telephony device 13, computers 14 and 15, personal video player 16, or other host devices that process Ethernet signals such as Ethernet signals 108. Co-processing module 106 can be incorporated into any or all of these host devices to provide Ethernet processing and further to execute one or more applications of the host device.

Figure 3:
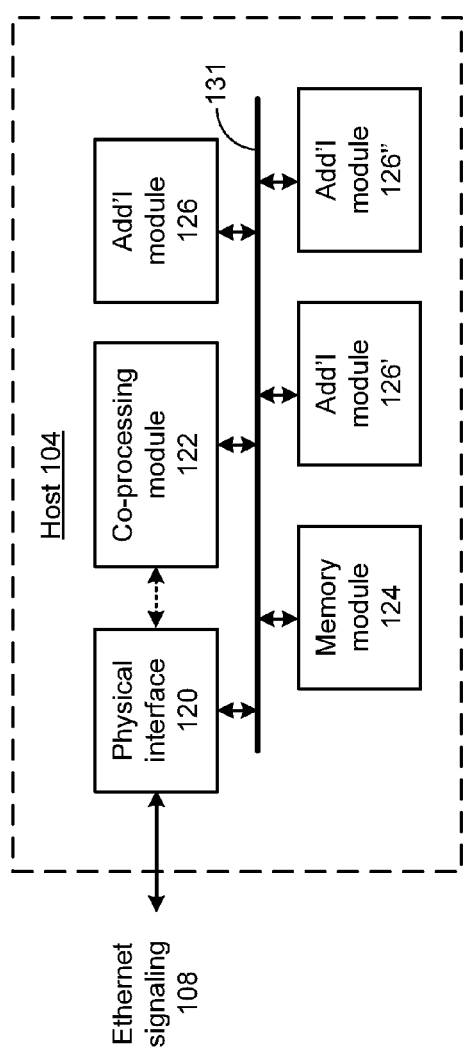
FIG. 3 presents a block diagram representation of a host 104 in accordance with an embodiment of the present invention.

FIG. 3 presents a block diagram representation of a host module 104 in accordance with an embodiment of the present invention. Host 104, such as hosts 11-16 or other host device executes one or more applications that are based on or otherwise utilize communication with one or more remote devices. In particular, host 104 includes a physical interface, such as a physical interface in accordance with IEEE 802.3 for coupling the host 104 to an Ethernet communication path and to send and receive Ethernet signaling 108. Host 104 further includes a memory module 124 and a co-processing module 122 that are coupled to the physical interface 120 via bus 131 that is shown. Host 104 optionally includes one or more additional modules 126, 126', 126". . . such as input/output devices, drivers, buffers, other processing elements including optionally special purpose processing elements, and/or other devices for performing additional functions associated with the operation of host 104. While a particular bus architecture is shown, alternative bus architectures that include two or more data buses or direct connectivity between modules of host 104 are likewise possible. In particular, physical interface 120 can optionally be directly coupled to co-processing module 122 as shown.

As discussed in conjunction with FIG. 1, the co-processing module 122, for example co-processor 106, runs one or more host applications via one or more processors. One or more other processers are used to offload the Ethernet processing to convert received Ethernet signals 108 into Ethernet data that is transferred to the processor or processors running the host application or applications. In addition, data generated by the host applications can be transferred to the one or more other processors for processing to generate outbound Ethernet signals 108 that contain that data.

The co-processing module 122 can be implemented a plurality of processing devices. Each processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 124. Memory module 124 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 4:
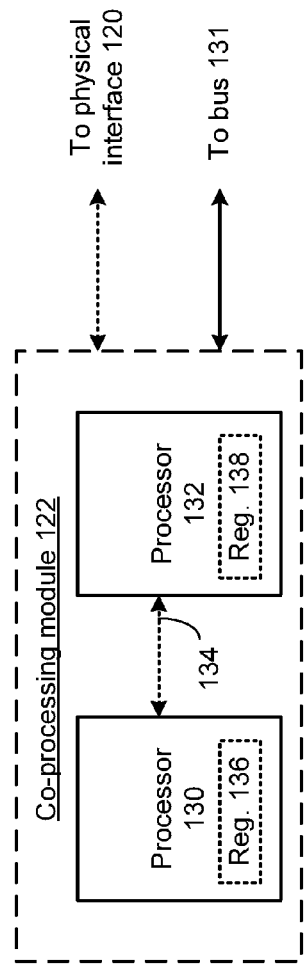
FIG. 4 presents a block diagram representation of a co-processing module 122 in accordance with a further embodiment of the present invention.

FIG. 4 presents a block diagram representation of a co-processing module 122 in accordance with a further embodiment of the present invention. In particular, co-processing module 122 includes processors 130 and 132 that contain registers 136 and 138, respectively. As discussed in conjunction with FIG. 3, co-processing module is coupled to bus 131. Co-processing module is coupled to physical interface 120 to bi-directionally communicate data via Ethernet signaling 108, either directly or indirectly through bus 130, for instance.

Processor 130 executes applications of the host 104 via an operating system that is either an open operating system or a commercially available proprietary operating system such as Unix, Linux, Windows, MAC OS, etc. As previously discussed, processing of Ethernet data used in conjunction with the host application is offloaded to processor 132. Processor 132 itself runs an operating system that is either an open operating system or a commercially available proprietary operating system such as Unix, Linux, Windows, MAC OS, etc. As previously discussed, processing of Ethernet data used in conjunction with the host application is offloaded to processor 132. Processors 130 and 132 can operate via the same operating system or via different operating systems.

In an embodiment of the present invention, the host application of processor 130 sends and receives data by generating socket system calls of the operating system. This data is communicated to and from the processor 132 via a communication path 134. In this fashion, Ethernet data received via the physical interface 120 can be processed via processor 132 and transferred to processor 130 for use by the host application. Further, data generated by the host application can be transferred to processor 132 and converted to Ethernet data for transfer to physical interface 120.

The communication path 134 can generally be implemented via parallel or serial communications that are either synchronous or asynchronous. In an embodiment of the present invention, data is transferred between processors 130 and 132 via registers 136 and 138 and system calls. In particular, data be transferred to another processor is stored in a corresponding register. An interrupt is generated to the other processor to cause the other processor to retrieve the stored data. While internal registers 136 and 138 are shown, one or more external registers, latches, or buffers (not shown) could likewise be employed in the implementation of communication path 134. Further details regarding this communication including optional functions and features are provided in conjunction with FIG. 5 that follows.

Figure 5:
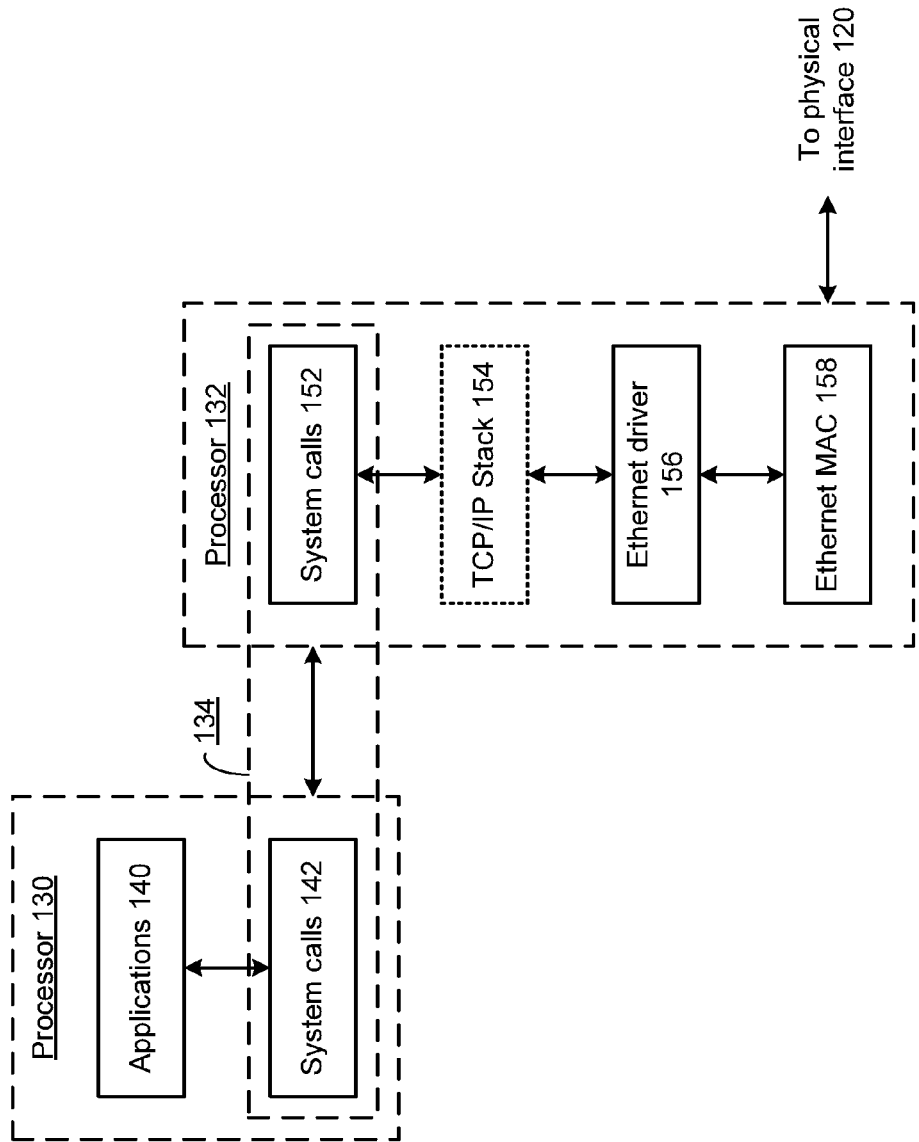
FIG. 5 presents a block diagram representation of processors 130 and 132 in accordance with a further embodiment of the present invention.

FIG. 5 presents a block diagram representation of processors 130 and 132 in accordance with a further embodiment of the present invention. As discussed in conjunction with FIG. 4, host applications 140 send and receive data via socket system calls. The Ethernet processing of the data is offloaded to processor 132 and implemented by executing an Ethernet driver 156, and an Ethernet media access control layer 158 to convert data from the host applications 140 to Ethernet packets that include an Ethernet header with source and destination MAC addresses, the data payload and the appropriate cyclic redundancy checksum (CRC). A transport control protocol/Internet protocol (TCP/IP) stack 154 is optionally included as an additional processing layer for formatting the data for applications involving communication via IP networks. Communications between processors 130 and 132 are implemented via system calls 142 and 152. In addition, processor 132 bidirectionally communicates Ethernet data formatted in Ethernet packets with physical interface 120.

In one example of operation, system calls 142 and 152 operate to communicate data from the first processor to the second processor by:
1. storing the data in a register, such as register 136 or 138;
2. generating an interrupt signal in processor 130 and sending the interrupt signal to the processor 132; and
3. executing an interrupt service routine via the processor 132 in response to the interrupt signal that causes the processor 132 to read the data from the register 136 or 138.

In a further example of operation, system calls 142 and 152 operate to communicate data from the second processor to the first processor by:
1. storing the data in a register, such as register 136 or 138;
2. generating an interrupt signal in processor 132 and sending the interrupt signal to the processor 130; and
3. executing an interrupt service routine via the processor 130 in response to the interrupt signal that causes the processor 130 to read the data from the register 136 or 138.

It should be noted that while foregoing has focused on offloading Ethernet processing on to a co-processor, similar techniques described above could likewise be employed for offloading processing associated with other communication interfaces such an 802.11 connection, Bluetooth connection, infrared connection, USB connection, Firewire (IEEE 1394) connection, SCSI connection, PCMCIA protocol, or other protocol either standard or proprietary. Further, in an embodiment of the present invention, processing associated with two or more different communications interfaces can be offloaded to two different coprocessors that each operate in a similar fashion to processor 132 or a single coprocessor that implements communication processing in conjunction with each of the plurality of communication interfaces.

Figure 6:
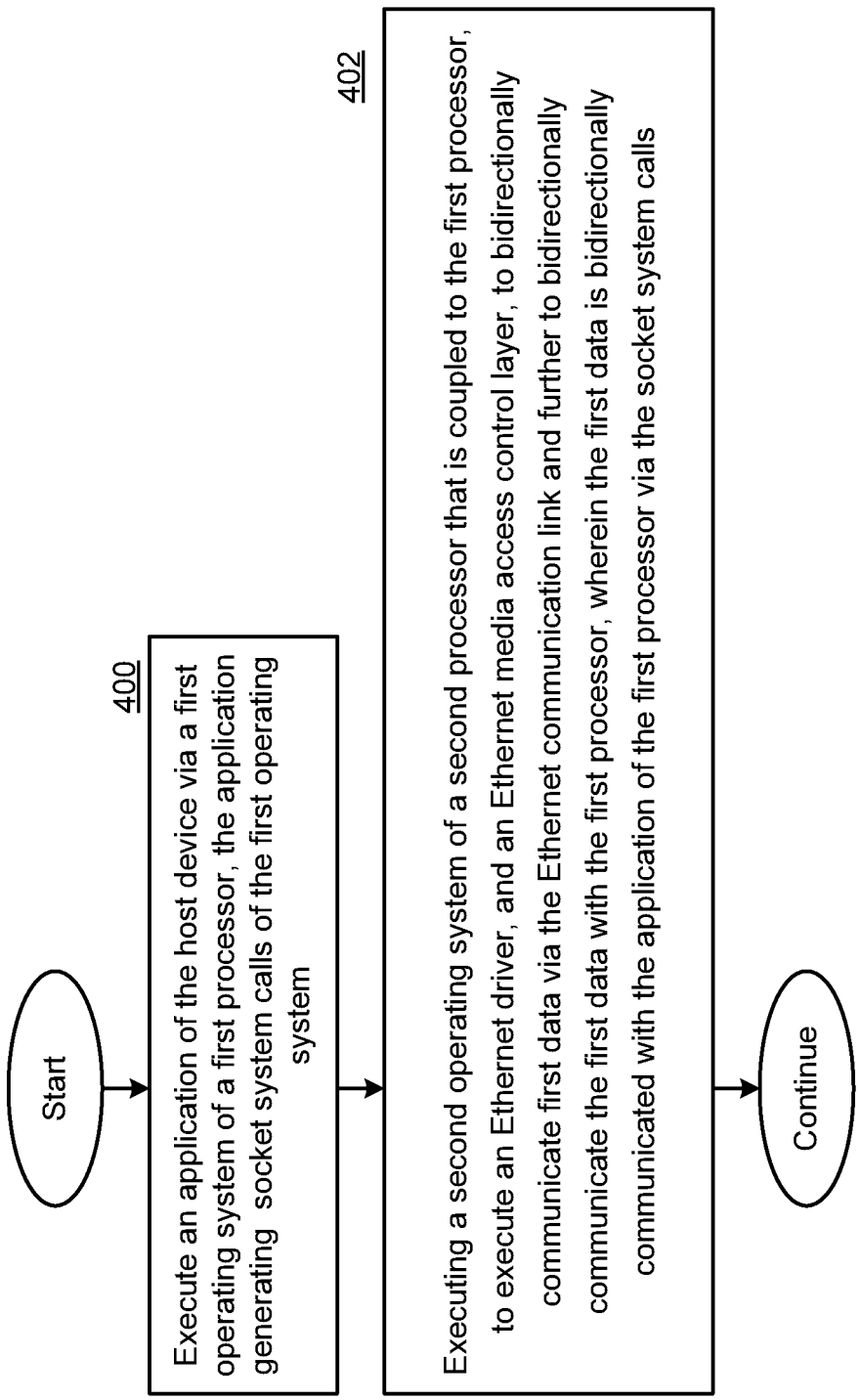
FIG. 6 presents a flowchart representation of a method in accordance with an embodiment of the present invention.

FIG. 6 presents a flowchart representation of a method in accordance with an embodiment of the present invention. In particular, a method is shown for use in conjunction with one or more functions and features described in conjunction with FIGS. 1-5. In step 400, an application of the host device is executed via a first operating system of a first processor, the application generating socket system calls of the first operating system. In step 402, a second operating system is executed in a second processor that is coupled to the first processor. The operating system executes an Ethernet driver, and an Ethernet media access control layer, to bidirectionally communicate first data via the Ethernet communication link and further to bidirectionally communicate the first data with the first processor.

In an embodiment of the present invention, the first data is bidirectionally communicated with the application of the first processor via the socket system calls. The first data can be bidirectionally communicated between the first processor and the second processor via system calls. Such system calls can operate based on processor interrupts. The first and second operating systems can be the same or different. The first and second operating systems can both be open operating systems.

FIG. 7 presents a flowchart representation of a method in accordance with an embodiment of the present invention. In particular, a method is shown for use in conjunction with one or more functions and features described in conjunction with FIGS. 1-6. In step 410, second data is stored in a first register. In step 412, a first interrupt signal is generated in the first processor and the first interrupt signal is sent to the second processor. In step 414, a first interrupt service routine is executed via the second processor in response to the first interrupt signal, the first interrupt service routine causing the second processor to read the second data from the first register.

FIG. 8 presents a flowchart representation of a method in accordance with an embodiment of the present invention. In particular, a method is shown for use in conjunction with one or more functions and features described in conjunction with FIGS. 1-7. In step 420, third data is stored in a second register. In step 422, a second interrupt signal is generated in the second processor and sent to the first processor. In step 424, a second interrupt service routine is executed via the first processor in response to the second interrupt signal, the second interrupt service routine causing the first processor to read the third data from the second register.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a host and a co-processing module for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A co-processing module for use in a host device that communicates with at least one remote device via an Ethernet communication link, the co-processing module comprising:
   a first processor that executes an application of the host device via a first operating system, the application generating socket system calls of the first operating system; and
   a second processor, coupled to the first processor, that executes a second operating system to execute an Ethernet driver, and an Ethernet media access control layer, to bidirectionally communicate first data via the Ethernet communication link and further to bidirectionally communicate the first data with the first processor;
   wherein the first processor bidirectionally communicates the first data with the application via the socket system calls.

2. The co-processing module of claim 1 wherein the second processor bidirectionally communicates the first data with the first processor via system calls.

3. The co-processing module of claim 2 wherein the system calls operate based on processor interrupts.

4. The co-processing module of claim 2 wherein the system calls operate to communicate second data, included in the first data, from the first processor to the second processor by:
   storing the second data in a first register;
   generating a first interrupt signal in the first processor and sending the first interrupt signal to the second processor; and
   executing a first interrupt service routine via the second processor in response to the first interrupt signal, the first interrupt service routine causing the second processor to read the second data from the first register.

5. The co-processing module of claim 4 wherein the system calls further operate to communicate the third data, included in the first data, from the second processor to the first processor by:
   storing the third data in a second register;
   generating a second interrupt signal in the second processor and sending the second interrupt signal to the first processor; and
   executing a second interrupt service routine via the first processor in response to the second interrupt signal, the second interrupt service routine causing the first processor to read the third data from the second register.

6. The co-processing module of claim 1 wherein the first operating system and the second operating system are the same.

7. The co-processing module of claim 1 wherein the first operating system and the second operating system are both open operating systems.

8. The co-processing module of claim 1 wherein the second processor further executes a transport control protocol/Internet protocol stack.

9. A method for use in a host device that communicates with at least one remote device via an Ethernet communication link, the method comprising:
   executing an application of the host device via a first operating system of a first processor, the application generating socket system calls of the first operating system; and
   executing a second operating system of a second processor that is coupled to the first processor, to execute an Ethernet driver, and an Ethernet media access control layer, to bidirectionally communicate first data via the Ethernet communication link and further to bidirectionally communicate the first data with the first processor;
   wherein the first data is bidirectionally communicated with the application of the first processor via the socket system calls.

10. The method of claim 9 wherein the first data is bidirectionally communicated between the first processor and the second processor via system calls.

11. The method of claim 10 wherein the system calls operate based on processor interrupts.

12. The method of claim 10 wherein the system calls operate to communicate second data, included in the first data, from the first processor to the second processor by:
   storing the second data in a first register;
   generating a first interrupt signal in the first processor and sending the first interrupt signal to the second processor; and
   executing a first interrupt service routine via the second processor in response to the first interrupt signal, the first interrupt service routine causing the second processor to read the second data from the first register.

13. The method of claim 12 wherein the system calls further operate to communicate the third data, included in the first data, from the second processor to the first processor by:
   storing the third data in a second register;
   generating a second interrupt signal in the second processor and sending the second interrupt signal to the first processor; and
   executing a second interrupt service routine via the first processor in response to the second interrupt signal, the second interrupt service routine causing the first processor to read the third data from the second register.

14. The method of claim 9 wherein the first operating system and the second operating system are the same.

15. The method of claim 9 wherein the first operating system and the second operating system are both open operating systems.

* * * * *